United States Patent [19]

Stoll

[11] Patent Number: 5,606,993
[45] Date of Patent: Mar. 4, 1997

[54] MULTIWAY VALVE

[75] Inventor: Kurt Stoll, Esslingen, Germany

[73] Assignee: Festo KG, Esslingen, Germany

[21] Appl. No.: 370,501

[22] Filed: Jan. 9, 1995

[30] Foreign Application Priority Data

Jan. 13, 1994 [DE] Germany .......................... 44 00 760.4

[51] Int. Cl.[6] .................................................. F15B 13/042
[52] U.S. Cl. .................. 137/596.18; 137/596.16; 137/625.66
[58] Field of Search .................. 137/596.16, 596.18, 137/625.66

[56] References Cited

U.S. PATENT DOCUMENTS

| 3,090,396 | 5/1963 | Rudelick | 251/367 X |
| 3,092,141 | 6/1963 | Stark | 251/367 X |
| 3,139,109 | 6/1964 | Ruchser | 137/596.16 |
| 3,870,073 | 3/1975 | Ruchser et al. | 137/596.16 |
| 4,616,674 | 10/1986 | Bardoll | 137/596.16 X |
| 4,643,225 | 2/1987 | Imhof | 137/625.64 X |
| 4,860,792 | 8/1989 | Ichihashi et al. | 137/596.17 |
| 4,924,902 | 5/1990 | Lewis et al. | 137/596.16 X |
| 5,163,478 | 11/1992 | De Fries | 137/625.66 |
| 5,361,803 | 11/1994 | Stoll | 137/625.66 |
| 5,487,409 | 1/1996 | Stoll et al. | 137/625.66 X |

FOREIGN PATENT DOCUMENTS

| 2817442 | 10/1979 | Germany . | |
| 3315056 | 10/1984 | Germany . | |
| 3320879 | 12/1984 | Germany . | |
| 4011908 | 8/1991 | Germany . | |
| 62-13881 | 1/1987 | Japan | 137/596.16 |

Primary Examiner—Gerald A. Michalsky
Attorney, Agent, or Firm—Hoffmann & Baron

[57] ABSTRACT

A multiway valve has a valve spool space in its valve housing in order to accommodate two valve spools arranged in tandem. Since such two valve spools are able to be operated independently of each other, different valve functions may be performed by the valve.

18 Claims, 4 Drawing Sheets

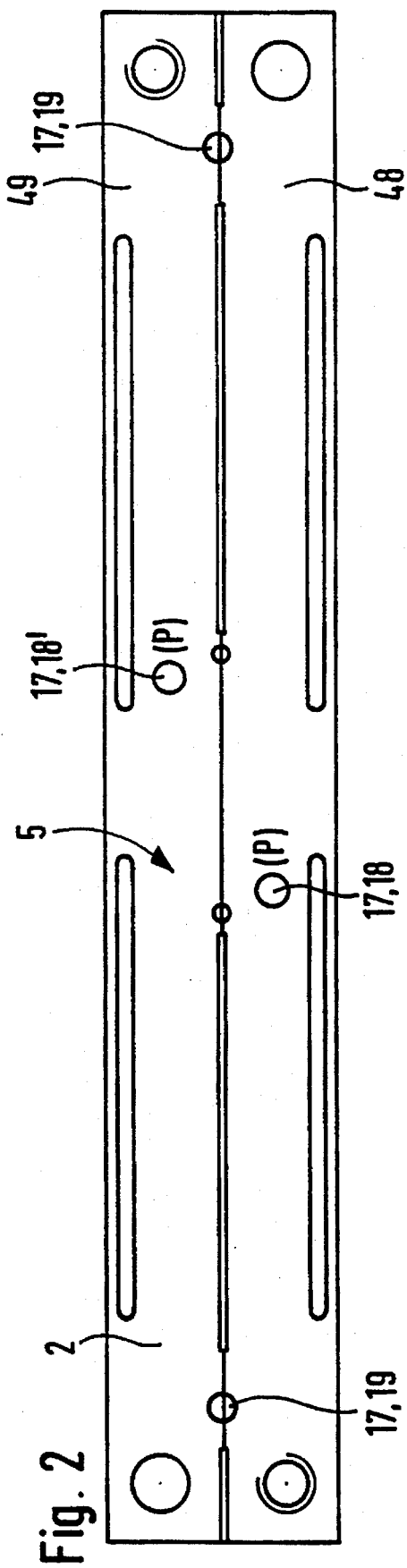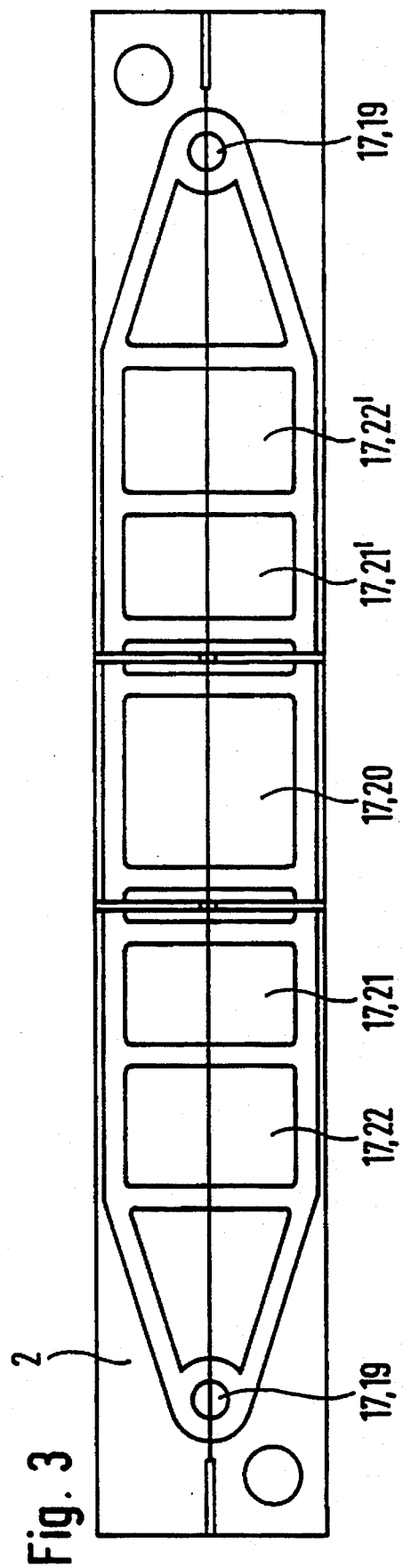

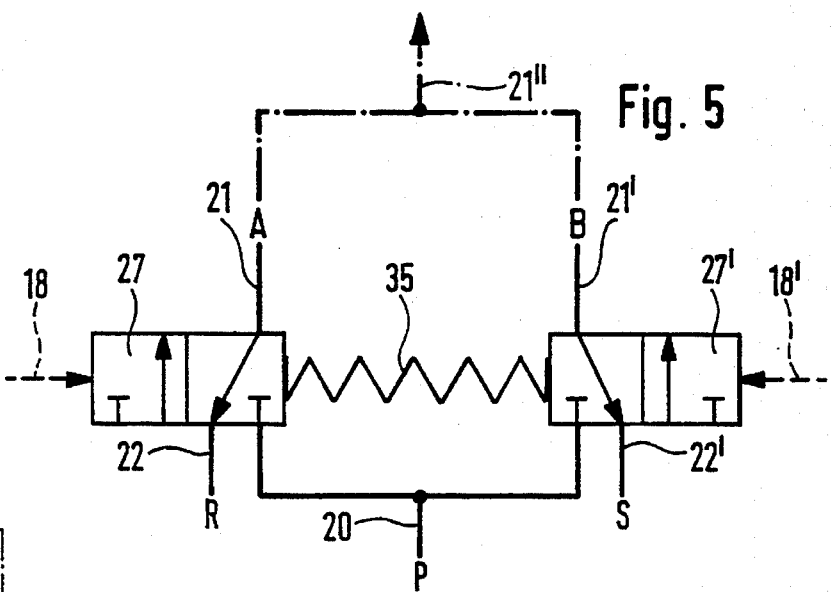
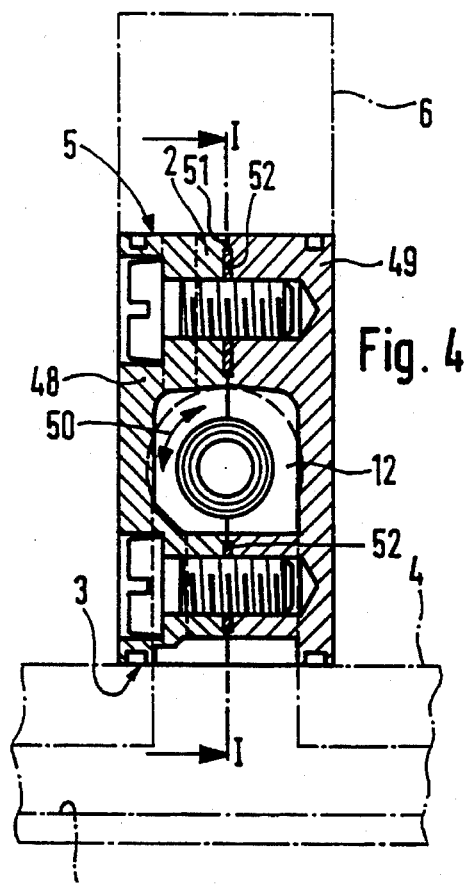
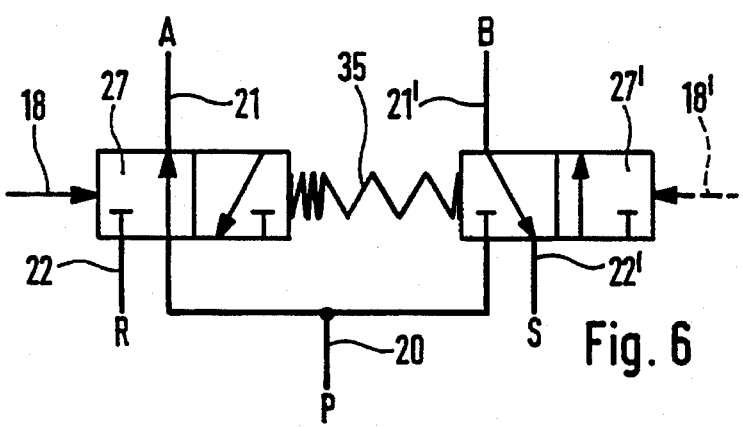

MULTIWAY VALVE

BACKGROUND OF THE INVENTION

The invention relates to a multiway valve comprising a valve housing, wherein an axially extending valve spool space is provided, wherein a valve spool arrangement is located, which is able to be moved longitudinally under the action of a control pressure in order to affect the supply of an actuating fluid to at least two valve power ducts opening laterally into the valve spool space.

THE PRIOR ART

A multiway valve of this type is for example disclosed in the German patent publication 4,011,908 C2, in which it is a question of a 5/3 way valve, whose valve spool may assume a center position and two further switching positions. In the two further switching positions passage of fluid is respectively possible through one of the two valve power ducts to a load connected with the valve, whereas the other valve power duct is shut off. Switching over between the positions is performed by a preferably pneumatic control fluid, with which working surfaces provided on the valve spool can be acted upon.

This known multiway valve is so designed that a certain, particular type of operation of a load connected with it is possible. It is more particularly employed for the operation of a double acting fluid power cylinder. For the operation of loads of other types multiway valves of a different design are utilized; in the case of the operation of single acting fluid power cylinders use is generally made of a so-called 3 way valve instead of a 5 way one, such 3 way valve only having one single valve power duct. In fact use is made of different valve sizes in order to cope with different flow rates for adaptation to the sizes of the fluid power cylinders to be operated. It will be apparent that the necessary number of different types of valve is the cause of a substantial expense for production, stocking keeping and logistics.

SHORT SUMMARY OF THE INVENTION

One object of the invention is to provide a multiway valve which is of compact design.

A further object of the invention is to create a valve which is of universal application.

In the case of a multiway valve of the type initially mentioned this aim is achieved since the valve spool arrangement comprises two separate valve spools, of which each is associated with one of two separate valve power ducts, and which are arranged coaxially in tandem in the valve spool space extending from one end to the other end, same being able to be independently shifted longitudinally upon application of a suitable control pressure on a respective working surface.

It is in this manner that the functions of two separate multiway valves are connected together in a single multiway valve. Each of the two valve spools may be operated in a manner which is comparable with the operation of a plain multiway valve. The length sections receiving the valve spools of the valve spool space are connected with one another so that there is a continuous valve spool space. Owing to the coaxial placement in tandem the valve is extremely compact in design. Seeing that the two integrated multiway valve functions may be performed independently from each other, the multiway valve in accordance with the invention is suitable for a multiplicity of different uses, in the case of which so far different valve types had to be employed.

By providing for a suitable action of the control pressure on the working surfaces of the two valve spools it is possible for example to operate the multiway valve as if there were two mutually separate multiway valves. This for example renders possible the operation of a double acting fluid power cylinder or two separate single acting fluid power cylinders. Furthermore it would be feasible to connect together the two valve power ducts if required in order despite the narrow design of the valve to obtain twice the flow rate otherwise possible and also to render possible the operation of larger fluid power cylinders.

Further advantageous developments of the invention are defined in the claims.

In the valve spool space, in which the mutually adjacent ends of the two valve spools take up their positions, it is convenient to have at least one actuating fluid or other means, with which the two valve spools may be loaded in opposite axial directions. The loading fluid may more particularly be a pneumatic fluid under pressure, which for instance comes from a valve supply duct extending in the valve housing. Preferably the actuating means is however a spring arrangement, which is placed between and bears against the two valve spools and biases the same respectively into a first switching position. Switching over from such first position into a second switching position, in which one respective valve spool is shifted toward the other valve spool, is then conveniently performed by the action of the control pressure on the respectively associated working surface.

It is convenient for the two valve spools arranged in the common valve housing to render possible a respective 3/2 way valve function, each valve spool having its own valve venting duct associated with it, while the two valve spools are preferably provided with a common valve supply duct.

Preferably the multiway valve is so designed that the two valve spools are able to be interchanged so that in place thereof, if required, a conventional, single piece valve spool may be employed in order for instance to produce the function of a 5/2 or a 5/3 way valve.

Particularly compact transverse dimensions are more particularly possible if the valve housing is longitudinally divided along the valve spool space and comprises a plurality of housing parts, which are placed against each other longitudinally in the part where the valve is split. Preferably the longitudinal splitting is such that there are two housing parts, which respectively constitute one housing half. Such a design furthermore renders possible a rapid replacement of the valve spools if required.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 1 shows a first design of the multiway valve in accordance with the invention in a longitudinal section taken on the line I—I of FIG. 4, two pilot or control valves and a fluid manifold bearing the multiway valve only being indicated in chained lines, the two valve spools being illustrated above the line of symmetry in a first switching position and underneath the line of symmetry in a second switching position.

3

FIG. 2 is a plan view of the multiway valve looking in the direction of arrow II in FIG. 1.

FIG. 3 is a view from below of the multiway valve of FIG. 1 looking in the direction of the arrow III of FIG. 1.

FIG. 4 is a cross section taken through the multiway valve of FIG. 1 taken on the section line IV—IV of FIG. 1.

FIG. 5 is a simplified circuit diagram of the valve of figure on assuming the first switching position of the valve spool, a connection together of the two valve power ducts as needed in some cases being indicated in chained lines.

FIG. 6 is a circuit diagram corresponding to the showing of FIG. 5, of the multiway valve in accordance with FIG. 1, the valve spool on the right having assumed the first switching position and the, valve spool on the left being in the second switching position.

DETAILED ACCOUNT OF WORKING EMBODIMENTS OF THE INVENTION

Figure 1:
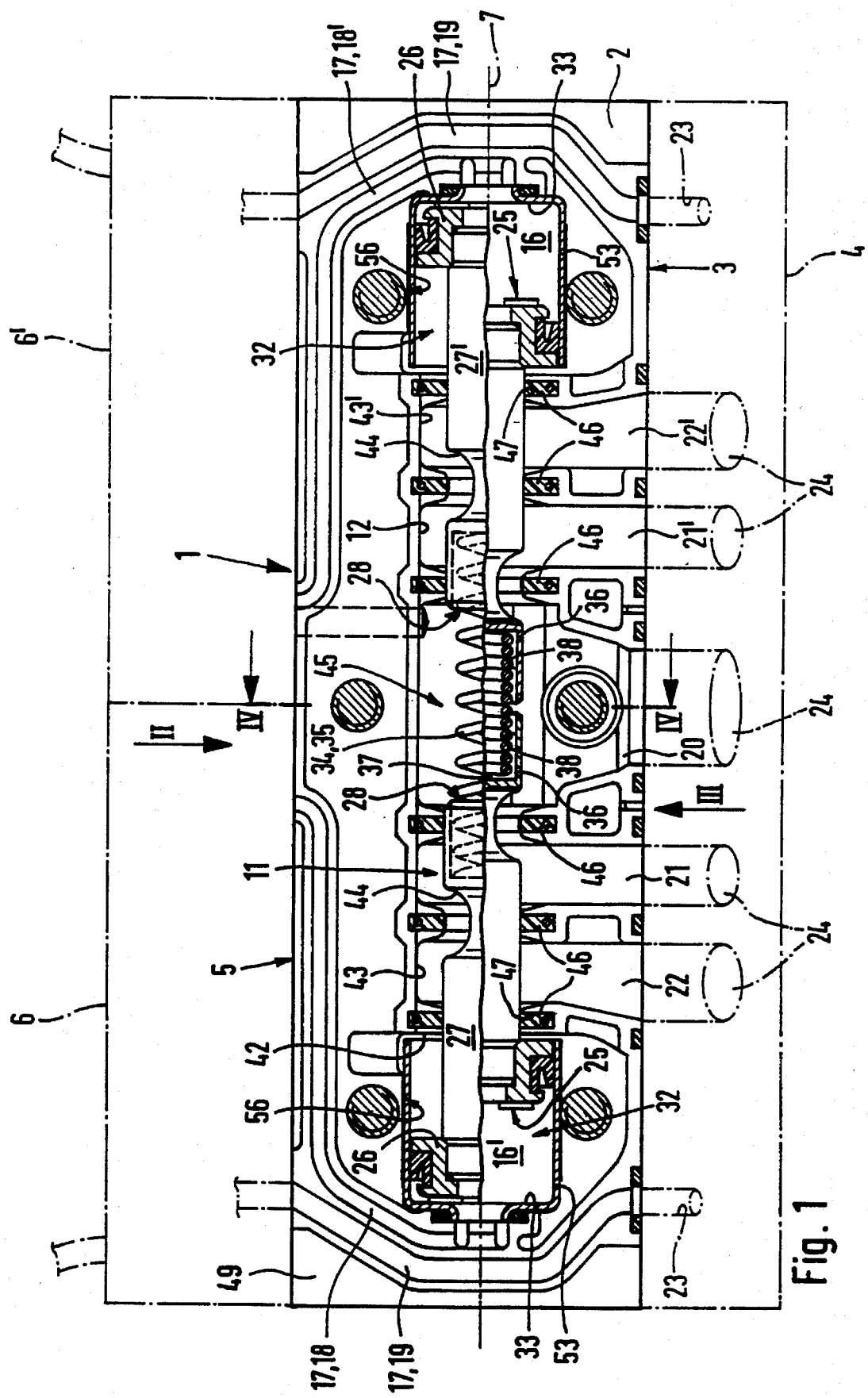

The multiway valve 1 described here by way of example comprises an elongated valve housing 2 with a block-like external form. As seen in cross section in accordance with FIG. 4 the valve will be seen to have a rectangular outline such that the height of the housing is preferably larger than the width of the housing. One of the two narrower external surfaces of the valve housing 2 serves in the present embodiment of the invention as a mounting surface 3 which is placed against, for instance, a fluid distribution manifold 4 as shown in chained lines. The external surface which is upwardly turned in terms of FIGS. 1 and 4 opposite to the mounting surface 3 constitutes a mounting surface 5 to be fitted with at least one and preferably—as shown in chained lines—two control valves 6 and 6'. In the case of the latter it is preferably a question of so-called solenoid valves, which are electrically driven.

In the interior of the valve housing 2 valve spool space 12 is formed, which extends in the longitudinal direction 7 of the housing. It accommodates a valve spool arrangement 11, to be described in more detail infra. At the two axial terminal parts of the valve spool space 12 there is a respective control space 16 and 16', which is able to be supplied with a control fluid under a control pressure in order to shift the valve spool arrangement 11 in the longitudinal direction 7 of the housing relatively to the valve spool space 12.

The supply of the control fluid to the control spaces 16 and 16' takes place via two valve control ducts 18 and 18', which extend in the wall of the valve housing 2 and respectively open on the one hand in one of the control spaces 16 and 16' and on the other hand at the mounting surface 5. At the mounting surface they are in communication with the control valves 6 and 6'. Two control fluid supply ducts 19 also extend through the valve housing 2 and communicate on the one hand, at the mounting surface 5, with a respective one of the control valves 6 and 6', whereas on the other hand they open at the mounting surface 3. Here they are in communication with the manifold control ducts 23 extending in the fluid manifold device 4, such ducts

4 supplying the control fluid. By operation of the control valves 6 and 6' it is possible to affect the supply of control operating pressure in the control spaces 16 and 16' in order to shift the valve spool arrangement 11 in the one or in the other direction.

The valve control ducts 18 and 18' and the control fluid supply ducts 19 belong to a number of valve ducts 17, which extend through the valve housing 2. Such valve ducts 17 furthermore include a valve supply duct 20, two valve power ducts 21 and 21' and two valve venting ducts 22 and 22'. These five last-named valve ducts 17 extend athwart the longitudinal direction 7 of the housing, same being arranged in the longitudinal direction 7 of the housing in tandem and respectively opening on the one hand peripherally into the valve spool space 12 and on the other hand at the mounting surface 3. Via the mounting surface they communicate with fluid distribution ducts 24 as shown in chained lines, which run in the fluid manifold device 4, which is for instance tabular in configuration. It is in this manner that via the fluid distribution manifold 4 a central supply and venting system is provided for several multiway valves 1, which are mounted side by side on the fluid manifold 4.

In the valve housing 2 the valve supply duct 20 is flanked on either side, as considered in the longitudinal direction 7 of the housing, by a respective one of the valve power ducts 21 and 21', which are then followed by a further one of the two valve venting ducts 22 and 22'.

The valve spool arrangement 11 possesses two separately formed individual valve spools 27 and 27'. They are jointly arranged in the valve spool space 12 designed to extend from one to the other end continuously, and are coaxially placed in tandem in the axial direction. The longitudinal axes of the two valve spools 27 and 27' consequently coincide with the longitudinal axis of the valve spool space 12.

The two valve spools 27 and 27' are ganged and, given the supply of a suitable control pressure at the associated control space 16 and 16', they may be shifted independently from one another in the axial direction.

Each of the valve spools 27 and 27' may in the present working embodiment, assume two switching positions, between which it can be shifted by axial displacement. In first switching position indicated in FIG. 1 above the center line the respective valve spool 27 and 27' is shifted toward the terminal part of the valve spool space 12. Accordingly between the two terminal surfaces 28 facing each other of the valve spools 27 and 27' there is a large axial clearance. In the second switching position shown underneath the center line in FIG. 1 a respective valve spool 27 and 27' is moved axially close to the other valve spool 27 and 27' with the result that said axial clearance is less.

At the two terminal parts of the valve spool space 12 a piston space 32 is provided, which receives an axially sliding pilot piston 26. The pilot piston 26 divides the piston space 32 into two space sections, the space section remote from the associated valve spool 27 and 27' constituting the respective pilot space 16 and 16'. The pilot piston 26 acts on the associated valve spool 27 and 27', which, dependent on the switching position, extends to a greater or lesser extent in the piston space 32 and more particularly is secured at its terminal part to the pilot piston 26.

In the initial position of the multiway valve 1 the two valve spools 27 and 27' are biased into the first switching position. This is performed by actuating or loading means 34, which in the embodiment of the invention is constituted by a spring arrangement 35 and is located in the valve spool space 12 adjacent to the two adjacent ends 36 of the, two valve spools 27 and 27', it preferably being arranged in the axial intermediate space 37 between the two valve spools 27 and 27'. It is an advantage that the spring arrangement 35 does not bear against the valve housing 2 but rather only on and between the two valve spools 27'. In the case of the embodiment of the invention the latter have a respective axial recess 38 in their mutually adjacent end surfaces, into which recess the spring arrangement 35 is received at its end so that it locked in position. In the case of the spring arrangement 35 given only by way of example it is a question of compression spring arrangement which consists of one or more helical compression springs.

The fluid loading means could also be a fluid under pressure, more particularly compressed air.

In order to define the first switching position each respective valve spool 27 and 27' is urged by the actuating means 34 against an abutment integral with the housing. This abutment is, in the present embodiment of the invention, constituted by the axial outer delimiting wall 33 of a respective piston space 32, on which the pilot piston 26, connected with the valve spool 27 and 27', runs at its working surface 25 facing the pilot space 16 and 16'.

For switching over each respective valve spool 27 and 27' control fluid is supplied into the associated pilot space 16 and 16' so as to act on the facing working surface 25. The second switching position is for its part defined by an abutment integral with the housing, which in the case of the embodiment cooperates via the pilot piston 26 with the associated valve spool 27 and 27' and preferably is constituted by the inner axial delimiting wall 42, opposite to the outer axial delimiting wall 33, of a respective piston space 32, through which the terminal part of the valve spool 27 and 27' slides axially.

Both valve spools 27 and 27' may assume their respective switching positions without mutual interference, something which renders possible a mutually independent operation thereof. Each valve spool 27 and 27' preferably has two abutments for it, 33 and 42 for this purpose, against which it may rest without touching the respectively other valve spool 27 and 27', independently of which position same is presently assuming.

The two valve spools 27 and 27' may independently perform a multiway valve function so that practically two multiway valve units are collected together is a common valve housing and constitute the multiway valve as such. The valve function of each respective valve spool 27 and 27' is in the present embodiment that of a 3/2 way valve. Each valve spool 27 and 27' extends in a length section 43 and 43' of the valve spool space 12, wherein respectively one of the valve power ducts 21 and 21' and of the valve venting ducts 22 and 22' opens. The valve supply duct 20 is associated with both valve spools 27 and 27' and opens medianly adjacent to the valve spool space 12, in which the two length sections 43 and 43' merge together. In the second switching position a respective valve spool 27 and 27' extends as far as the position adjacent to the said valve supply duct 20.

By having a suitable configuration of the respective valve spools 27 and 27', which is known as such, there will be, dependent on the respective position of switching, a certain association between the valve ducts 17 opening laterally into the valve spool space 12.

In the initial position of the multiway valve 1 defined by the first switching position of a respective valve spool 27 and 27' the supply of actuating fluid from the valve supply duct 20 to the adjacent valve power ducts 21 and 21' is interrupted. On the contrary these valve power ducts 21 and 21' are vented via the adjacent valve venting ducts 22 and 22'. In the second switching position a respective valve spool 27 and 27' will permit, via the valve spool space 12, communication between the valve supply duct 20 and the adjacent valve power duct 21 and 21' so that actuating fluid may be transferred and supplied to the respective valve power duct 21 and 21'. Simultaneously the valve venting ducts 22 and 22' are shut off.

The valve power ducts 21 and 21' may be connected with any desired loads. Frequently such load will be a fluid power drive cylinder of the single or double acting type. Since the two valve spools 27 and 27' are able to be switched independently from each other by means of the pilot valves 6 and 6' connected with them, it is possible without any difficulty to operate two separate loads independently from one another, that is to say to supply them with drive fluid or to vent them.

This will also be made clear by the circuit diagrams of FIGS. 5 and 6. In FIG. 5 the two valve spools 27 and 27' are in the first switching position, in which the two valve power ducts 21 and 21' are vented. If now for example one pilot valve 6 is operated, the associated valve spool 27 will be switched over into the second switching position so that the connected load will be supplied via the valve power duct 21 with actuating fluid (see FIG. 6). The operation of the other valve spool 27' is performed when required.

It is in this manner that it is possible, for instance, to operate two mutually independent, single acting fluid power cylinders.

The operation of the two valve spools 27 and 27' may be offset in phase as may be desired, either completely arbitrarily or in certain predetermined intervals of time.

There is furthermore the possibility to use a phase-offset operation of the two valve spools 27 and 27' to operate a double acting fluid power cylinder connected with the two valve power ducts 21 and 21', the forward stroke being caused using the one valve spool 27 and the return stroke being caused using the other valve spool 27'. Furthermore a form of operation is possible, in which the one power chamber of the cylinder is pre-vented in time and following this the other power chamber is vented. This renders possible a piston speed increased by up to 50% as compared with conventional 4 way valve operation.

FIG. 5 indicates that the two valve power ducts 21 and 21' may also be connected together as a common power duct 21". If a simultaneous operation of the two valve spools 27 and 27' is provided in such a manner that they respectively simultaneously assume the second switching position, then drive fluid will be supplied simultaneously via the two valve power ducts 21 and 21', this meaning that there is a doubling of the flow rate. This furthermore renders possible operation of large fluid power cylinders, given an extremely narrow overall size of the multiway valve employed.

In the case of simultaneous operation of a double action fluid power cylinder there is the possibility of locking the piston of the fluid power cylinder in the current position, while simultaneously having the second switching position of the two valve spools 27 and 27' and rendering possible a floating position of the piston while simultaneously being in the first switching position owing to simultaneous venting associated with it. In this respect in each case one of the two valve power ducts 21 and 21' is connected with respectively one of the power spaces of the power cylinder.

The length of the two valve spools 27 and 27' is preferably so selected that the valve spools 27 and 27' do not abut at their ends 28 when they assume the second switching position so that the switching position do not affect one another.

The two valve spools 27 and 27' are, as in the present embodiment, preferably designed in the form of piston spools and externally have a cylindrical or more particularly circularly cylindrical outline, at least one circumferentially complete groove-like recess 44 or waist being provided. This recess 44 is, in the first switching position, in the part between one valve power duct 21 and 21' and a valve vent duct 22 and 22', whereas in the second switching position it is in the part between the valve supply duct 20 and a valve power duct 21 and 21'. It therefore renders possible, in the respective setting, a transfer connection between the two associated valve ducts 17.

The actuating means 34 is in the transition between the two length sections 43 and 43' of the valve spool space 12, in which the valve supply duct 20 opens. It is therefore preferentially possible for the actuating fluid, constantly present in this transition part, to act on the end surfaces of the valve spools 27 and 27' and to urge them toward the second switching position.

The two valve spool 27 and 27' are in the present embodiment designed without seals. It is for example a question of aluminum components. In order to prevent transfer of fluid axial adjacent parts of the valve spool space 12, several individual sealing rings 46 are provided, which are so set in the valve spool space 12 in axial succession coaxially that they respectively surround the respectively associated valve spool 27 and 27'. Dependent on the switching position of the valve spools 27 and 27' one sealing ring 46 will assume a position adjacent to a recess 44, whereas at the same time one or more other sealing rings 46 will be in sealing contact with valve spool sections placed axially adjacent to the recesses 44. It is in this manner that a fluid connection between the laterally opening valve ducts 17 is controlled.

In order to produce the two 3/2 way valve functions provided in the embodiment, the valve spools 27 and 27' have associated with them three sealing rings 46 placed with an axial spacing in tandem, which are respectively set in an annular holding recess 47, which is preferably a direct part of the valve housing 2 and is more particularly directly formed in the valve housing 2. It is in this manner that the sealing rings 46 may perform a double function since they exert a static sealing action as regards the valve housing 2 while on the other hand as regards the valve spools 27 and 27' they perform a dynamic sealing action. An additional sleeve arrangement provided between the valve housing 2 and the piston spool 3, as is for example disclosed in the European setting 0 122,247 B1 is consequently unnecessary, this simplifying structure and assembly substantially.

The fitting of the sealing rings 46, which are preferably not connected together and represent single rings, and furthermore that of the two valve spools 27 and 27' and of the pilot pistons 26 is more especially simple in the case of the present multiway valve 1, seeing that the valve housing 2 is preferably longitudinally split or divided. It is composed of several and more particularly two housing parts 48 and 49, which respectively constitute a part, extending some distance in the peripheral direction (double arrow 50), of the wall of the valve spool space 12 including the associated peripheral sections of the holding recesses 47 and otherwise extend without transverse division at least over the length of the valve spool space 12 and preferably over the entire length of the valve housing.

The joint portion 51 present between the housing parts 48 and 49 preferably extends in a plane running in the longitudinal direction 7 of the housing and simultaneously in a radial direction. At the joint portion 51 the housing parts 48 and 49 are put together at mating joint surfaces.

Prior to assembly of the multiway valve 1 the two housing parts 48 and 49 are initially separate. Accordingly the valve spool space 12 is open peripherally so that the sealing rings 46 and the two valve spools 27 and 27' may be inserted without difficulty. Then the two housing parts 48 and 49 are put together and as in the embodiment screwed together or bonded or welded to one another.

In order to produce a sealing action in the joint portion 51, in the working embodiment a seal 52 is placed in between. It is possible to do without it in some cases by, for example, lapping to produce exactly fitting joint surfaces.

In order to prevent the pilot piston 26 running on joints in the parting portion 51, the piston spaces 32 are in the embodiment lined by pot-like guide sleeves 53, which are inserted in housing recesses 56 adjoining the valve spool space 12 and which owing to the longitudinal division are provided respectively for one half in one of the two housing parts 48 and 49.

A further advantage of the valve housing 2, which in the present embodiment is longitudinally divided, is that the valve ducts 17 present are so placed that they extend in the joint portion 51 between the two housing parts 48 and 49. However, the number of the valve ducts 17 running in the joint portion 51 may be less, dependent on the type of valve, than the total number of valve ducts. It is an advantage in any case, if at least one longitudinal section of the overall length of at least one valve duct 17 is placed in the joint portion 51, it being an advantage, if at least the valve pilot ducts 18 and 18' and/or the control fluid supply ducts 19 extend at least partially along the joint portion 51. Such design is advantageous more particularly because it renders possible the production of the respective valve duct length section starting from one of the joint surfaces, which prior to assembly are accessible in an optimum fashion. Complicated configurations of the ducts may also be produced in this manner without problems.

The sealing rings 46 preferably consist of a sealing member of elastic material, in which a support or backing ring is partially or completely embedded in order to endow the structure with a certain degree of dimensional rigidity.

It is an advantage if the valve housing 2 exclusively consists of housing parts 48 and 49 placed together longitudinally which as in the embodiment simultaneously constitute the end housing walls so that a separate housing end members are not required.

A further advantage of the multiway valve 1 in accordance with embodiment is that the two valve spools 27 and 27' may be replaced by an initial integral, uniform valve spool 57 in order to produce multiway valves of other types. In this case changes in the selection of the sealing rings 46 and as regards the arrangement of the valve ducts 17 are not possible.

Figure 7:
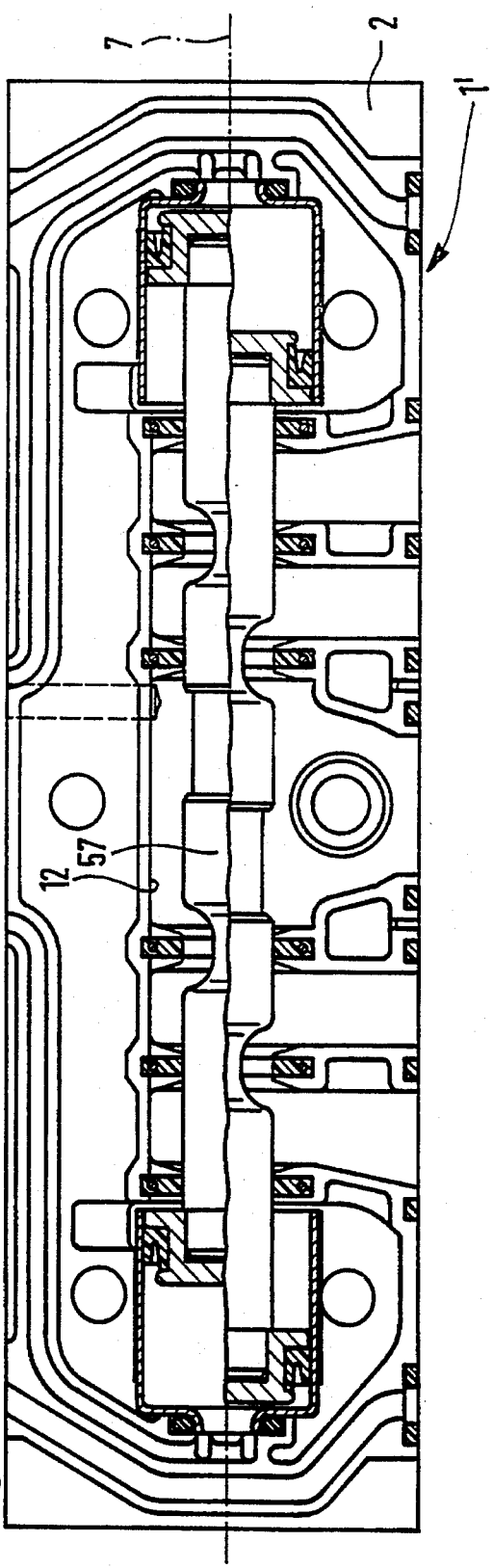
FIG. 7 shows the multiway valve in accordance with FIG. 1 after the two valve spools have been replaced by an integral valve spool so that a 5/2 way valve function is produced.

FIG. 7 shows such a modified multiway valve 1', which has a continuous, integral valve spool 57 so that instead of the original two 3/2 way valve functions a 5/2 way valve function is produced. It is possible to think of the valve spool 57 as having been produced by a permanent connection of the two valve spools 27 and 27', whereas all other parts are kept.

Figure 8:
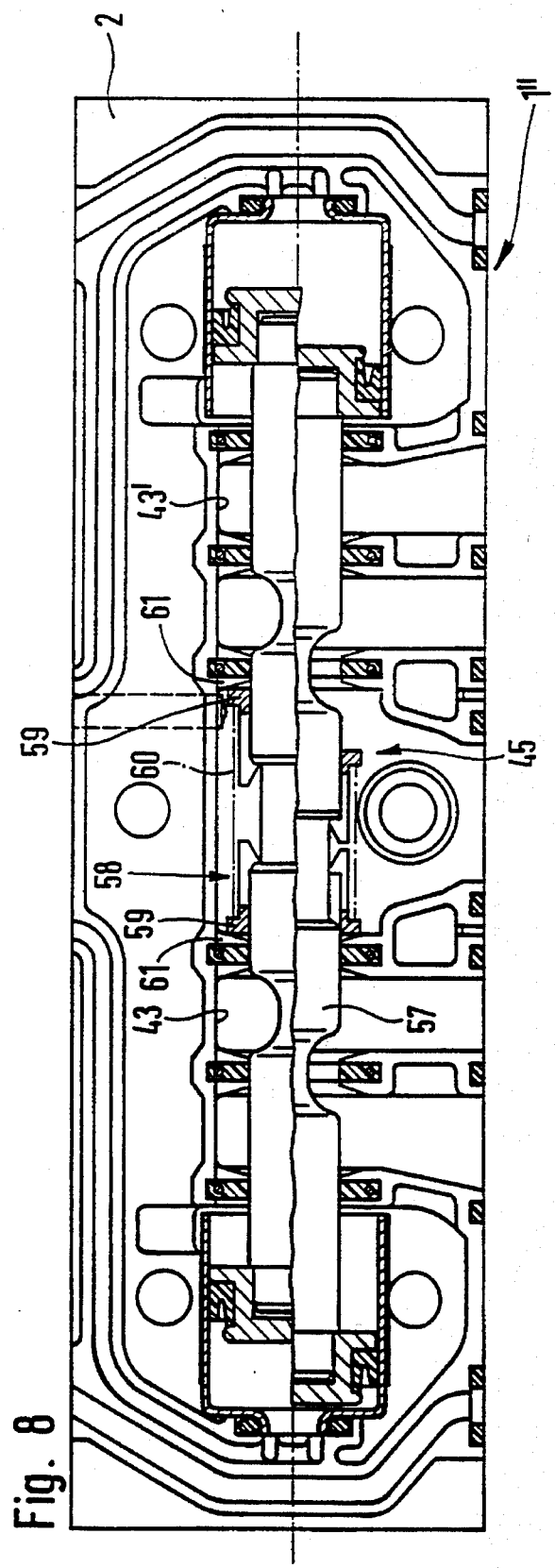
FIG. 8 shows the multiway valve in accordance with FIG. 1 after the two valve spools have been replaced by a single, uniform or integral valve spool and a centering device with the result that a 5/3 way valve function is rendered possible.

In the case of a modified multiway valve 1" as in FIG. 8 the same valve spool 57 is employed as in the multiway valve 1' of FIG. 7. However, in this case in the transition portion between the two longitudinal sections 43 and 43' of the valve spool space 12 there is the provision of a centering device 58 by means of which a 5/3 way valve function is made available. The design of such a middle centering device 58 is basically familiar in the art and is for example described in the said German patent publication 4,011,908 C2, so that no details must be provided here. It comprises two axially spaced projections 59 arranged in a sliding fashion on the valve spool 57, which are acted upon by a compression spring arrangement 60 in opposite directions so that in a manner not described in detail they bear on abutments (not illustrated) integral with the housing. In the center position of the valve spool 57 these two projections 59 also bear against abutments 61 integral with the housing. If the valve spool 57 is now displaced in the one or the other direction, owing to the compression of the compression spring arrangement 60, a return force will be produced, which will constantly tend to urge the valve spool 57 into the center position.

The multiway valve in accordance with the invention renders possible a large number of different functions with the possibility of use both for single acting and also for double acting fluid power cylinders, there being an extremely compact mechanical design. Production is possible at economic prices, seeing that the longitudinally divided housing structure renders possible chipless manufacture of the housing halves. Dependent on the type of control of the two valve spools it is possible to implement the functions of different valve types, as for example of two 3/2 way valves, a 5/2 way valve or a 5/4 way valve. Further possibilities of combination are produced if the two valve spools respectively render possible a 2/2 way valve function.

I claim:

1. A multiway valve comprising:

a valve housing having a valve spool space therein, the housing being longitudinally divided into at least two parts along a parting plane forming a joint portion adjacent to the spool space;

a valve spool arrangement, the spool space being adapted to receive the valve spool arrangement, the valve spool arrangement including two valve spools arranged coaxially in tandem and which are independently axially slideable within the spool space, each valve spool having a piston disposed on a terminal part thereof, each piston being axially slidable within a piston space, each piston space being disposed at a terminal end of the valve spool space, the piston providing for axially shifting of its associated valve spool upon engagement with a control pressure thereby affecting a supply of an actuating fluid; and a pair of guide sleeves, each sleeve lining one of the piston spaces and being radially disposed therein.

2. The multiway valve as set forth in claim 1, comprising at least one loading means disposed in the valve spool space adjacent to adjacent ends of the two valve spools to urge the two valve spools in opposite axial directions.

3. The multiway valve as set forth in claim 2, wherein the at least one loading means is designed in the form of a spring arrangement.

4. The multiway valve as set forth in claim 2, wherein the at least one loading means is located between the two valve spools and is adapted always act on both valve spools.

5. The multiway valve as set forth in claim 2, wherein the two valve spools have recesses in mutually adjacent end surfaces thereof, in which recess at least one loading means is received in an at least one partly sunk manner.

6. The multiway valve as set forth in claim 1, wherein each valve spool is designed in the form of a piston spool.

7. The multiway valve as set forth in claim 1, wherein each valve spool is adapted to assume two switching positions, between which it is able to be switched by axial shifting, all switching positions being set because the respective valve spool is adapted to bear against an abutment integral with the housing, the two valve spools not interfering with each other as regards their possible switching positions.

8. The multiway valve as set forth in claim 7, wherein each valve spool is connected with a piston, which is arranged in a piston space in the valve housing for axial movement therein, the piston space being bound by two abutments, the abutments being formed by an inner and an outer axial limiting wall.

9. The multiway valve as set forth in claim 1, further including at least two valve power ducts opening laterally into the valve spool space and wherein each of the valve ducts is associated with one of the valve spools.

10. The multiway valve as set forth in claim 9, further including a supply duct and an exhaust duct associated with each valve, each valve and its associated valve ducts being adapted to perform a three way valve function.

11. The multiway valve as set forth in claim 9, comprising a means for performing simultaneous operation of both valve spools so that an alternate, simultaneous start or interruption of the supply of the actuating fluid to the two valve power ducts is possible.

12. The multiway valve as set forth in claim 11, wherein both such valve power ducts are connected together as a common power duct.

13. The multiway valve as set forth in claim 9, comprising a means for ensuring a time-offset operation of the two valve spools so that an alternating start and interruption of the supply of the actuating fluid to the two valve power ducts is possible.

14. The multiway valve as set forth in claim 9, wherein at least one valve power duct extends through the valve housing, and at least one section of the length of such valve duct extending in the joint portion, the duct wall of such length section being composed of complementary peripheral wall sections, which are provided on the housing parts adjacent to each other in the joint portion at longitudinal sides thereof.

15. The multiway valve as set forth in claim 14, wherein a section of the length of a valve duct extending in the joint belongs to a valve control duct, the valve control duct communicating with the piston to supply control fluid for acting on the piston.

16. A multiway valve as set forth in claim 1, wherein the guide sleeves each include a generally planar back wall parametrically bounded by a side wall extending therefrom, the back wall having an aperture therethrough to allow for the passage of the control pressure.

17. A multiway valve as set forth in claim 1, wherein the guide sleeves guide the pistons and prevent leakage of the control fluid through the joint portion of the parting plane.

18. A multiway valve as set forth in claim 1, wherein the guide sleeves isolate the pistons from the joint portion of the parting plane thereby providing a regular surface for axial movement of the pistons.

* * * * *